US009665732B2

(12) United States Patent
Jayaraman et al.

(10) Patent No.: US 9,665,732 B2
(45) Date of Patent: May 30, 2017

(54) SECURE DOWNLOAD FROM INTERNET MARKETPLACE

(71) Applicant: SAP SE, Walldorf (DE)

(72) Inventors: Aswin Kumar Jayaraman, Chennai (IN); Vishal Trivedi, Wieslock (DE); Raghavendra Rao M G, Bangalor (IN)

(73) Assignee: SAP SE, Walldorf (DE)

( * ) Notice: Subject to any disclaimer, the term of this patent is extended or adjusted under 35 U.S.C. 154(b) by 356 days.

(21) Appl. No.: 14/322,399

(22) Filed: Jul. 2, 2014

(65) Prior Publication Data

US 2016/0004850 A1    Jan. 7, 2016

(51) Int. Cl.
| | |
|---|---|
| *G06F 21/10* | (2013.01) |
| *G06F 21/62* | (2013.01) |
| *G06F 12/14* | (2006.01) |
| *H04L 29/06* | (2006.01) |

(52) U.S. Cl.
CPC ...... *G06F 21/6218* (2013.01); *G06F 12/1483* (2013.01); *G06F 21/6254* (2013.01); *H04L 63/08* (2013.01); *G06F 2212/1052* (2013.01); *G06F 2221/2129* (2013.01); *G06F 2221/2141* (2013.01); *H04L 63/0421* (2013.01)

(58) Field of Classification Search
CPC ...................................... G06F 21/10
USPC ........................................ 709/225
See application file for complete search history.

(56) References Cited

U.S. PATENT DOCUMENTS

| | | | | |
|---|---|---|---|---|
| 6,424,370 | B1 * | 7/2002 | Courtney ............ | G06F 17/3079 348/135 |
| 2004/0088680 | A1 * | 5/2004 | Pieper ................... | H04L 69/329 717/114 |
| 2008/0027750 | A1 * | 1/2008 | Barkeloo ................ | G06F 21/10 705/26.1 |
| 2012/0331529 | A1 * | 12/2012 | Ibel ..................... | G06F 21/6218 726/4 |
| 2014/0136654 | A1 * | 5/2014 | Marar .................... | H04L 67/10 709/217 |

FOREIGN PATENT DOCUMENTS

| | | | | |
|---|---|---|---|---|
| CN | 102195953 A | * | 3/2010 | ............ H04L 29/06 |
| WO | WO 0058865 A1 | * | 10/2000 | ............ G06F 17/30 |

* cited by examiner

*Primary Examiner* — Kevin Bates
*Assistant Examiner* — Chen-Liang Huang
(74) *Attorney, Agent, or Firm* — Jones Day

(57) ABSTRACT

A method and system for secure download includes generating a path to a location where a downloadable object is temporarily stored. The method can include receiving a request for a downloadable object, generating one or more unique identifiers, creating a path to the requested object using the unique identifiers, storing a copy of the requested object in a temporary location indicated by the path, and returning the generated path to the requestor. The method can further include receiving a path to a downloadable object and, responsive to a determination that the path is valid, returning the downloadable object. A generated path can be rendered obsolete and its corresponding file removed from the temporary location after a predefined time interval has elapsed. A database of the generated paths and associated files may be periodically checked, and those paths and files that have been stored in the database beyond a predefinable expiry time can be removed.

24 Claims, 5 Drawing Sheets

200

300

400

500

SECURE DOWNLOAD FROM INTERNET MARKETPLACE

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyrights whatsoever.

BACKGROUND INFORMATION

Computing platforms such as SAP NetWeaver® enable composition, provisioning, management, and integration of applications across a heterogeneous software environment. One of the development tools introduced by SAP NetWeaver® is the Advance Business Application Programming (ABAP) Workbench, which is a language and environment for working with development objects and packages. One of the tools available in the ABAP workbench is a MIME repository, which stores internet media type (MIME) development objects. Software applications, including Web applications, may be developed using ABAP, for example, as repository objects and may be published to a marketplace.

Marketplaces, which may be accessible via the Internet, such as Apple® App Store, Google Play®, Blackberry World®, and SAP® Enterprise Store enable users to download software applications. For example, SAP® Enterprise Store is an integrated internal marketplace that enables customers to position applications on disparate platforms and various sources within their respective enterprises for consumption by employees, partners, and an ecosystem including customers and customers of customers.

Typically, an object stored in the MIME repository may be accessed by anyone having a uniform resource locator (URL) to the object. Sometimes, a URL can be used to download the object, and a marketplace may be bypassed altogether. The URL can also be shared between among users, so that anyone with the URL can download the object, regardless of whether the user is part of an intended audience. However, customers desire that interactions with the marketplace, including download of applications, be secure. In some cases, certain applications may be intended for some, but not all users of the Internet marketplace. Thus, there exists a need in the art for secure download of objects from Internet marketplaces.

DETAILED DESCRIPTION

The present invention relates to a method and system of generating a path to the downloadable object for secure download. More specifically, it relates to methods for authenticating a user and generating and periodically refreshing or deleting a path to an object in a database.

In an exemplary embodiment, a processor can receive a request for a downloadable object. The processor can extract parameters regarding the downloadable object and the requestor from the request. The processor can then authenticate the requestor. If the requestor is authenticated, then the processor can generate one or more unique identifiers based on the extracted parameters. A copy of the requested downloadable object can be stored in a temporary location, and a path to the temporary location can be created. The path can include the one or more unique identifiers, and the path can be returned using which the requestor can access the requested downloadable object.

Figure 1:
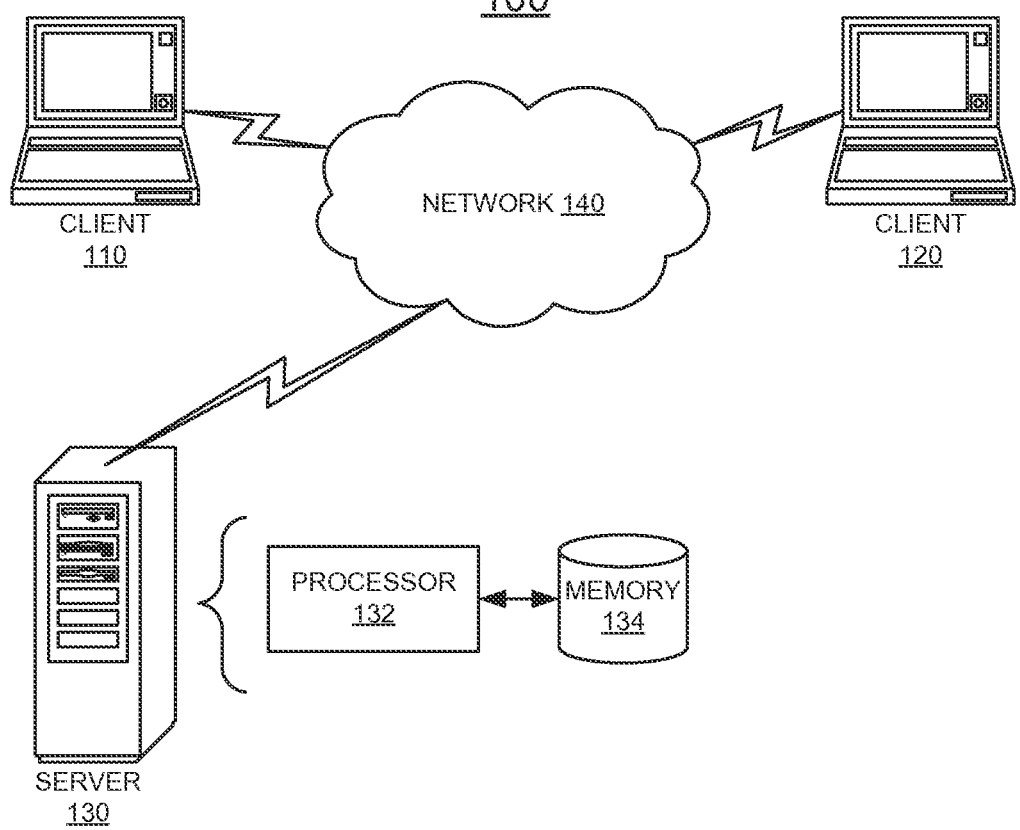
FIG. 1 is a simplified block diagram of a system implementing the methods and systems described herein.

FIG. 1 is a simplified block diagram of a secure downloading system 100. The system 100 can include a plurality of clients 110, 120 and a server 130 interconnected via network 140. The server can include a processor 132 in communication with a computer-readable medium 134. The computer-readable medium 134 can be a database internal or external to the processor or external storage means. The computer-readable medium 134 can include instructions executable by the processor such that when the processor executes various portions of the instructions, the instructions cause the processor to perform the various methods described herein. Each of the clients 110, 120 can communicate with the processor 132 to request applications stored in the server 130. For example, applications offered in an Internet marketplace may be stored on the server 130.

In FIG. 1, the clients 110, 120 are illustrated as laptop computers, but the principles of the present invention are not so limited. Embodiments of the present invention find application with personal computers (including desktop computers), tablet computers, and smart mobile device. The network 140 represents any number of networks that convey data between the server 130 and clients 110, 120, including for example wireline and/or wireless communication networks. The network 140 may exchange data in circuit-switched or packet-switched channels. Representative networks include telecommunications networks, local area networks, wide area networks and/or the Internet. For the purposes of the present discussion, the architecture and topology of the network 140 are immaterial to the operation of the present invention unless explained herein.

Figure 2:
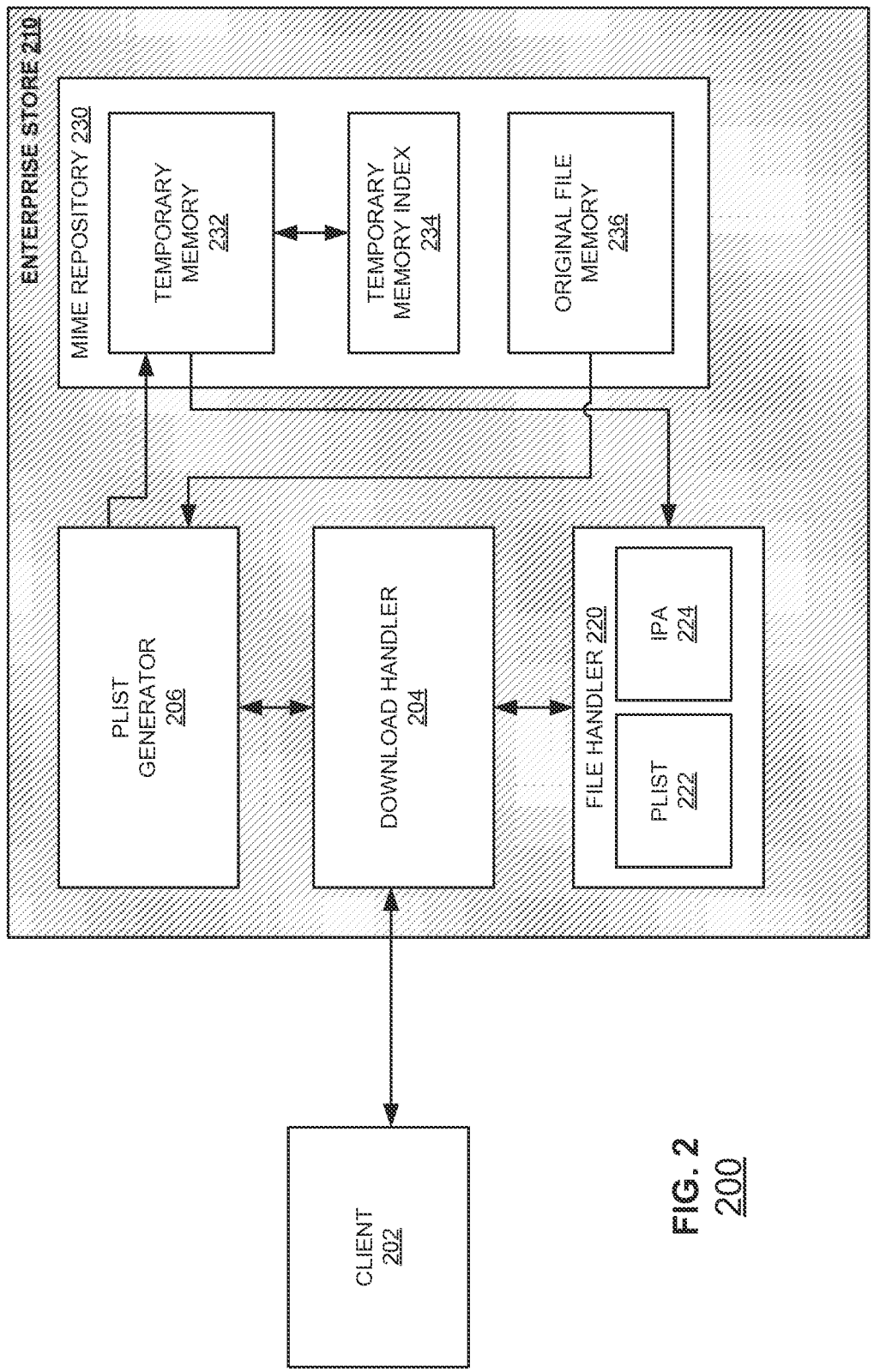
FIG. 2 is a functional block diagram of a download system according to an example embodiment.

FIG. 2 is a functional block diagram of a secure download system 200. The system can include a client 202 in communication with an Internet marketplace such as an enterprise store 210. Compared with typical Internet marketplace downloading systems, the security of the system is improved by structuring, accessing, and modifying the contents of the system 200 as further described herein.

The client 202 can include a processor and a computer-readable medium storing instructions executable by the processor such that when the processor executes various portions of the instructions, the instructions cause the processor to request an executable file, an application, a downloadable object, or the like from the enterprise store 210. The client can be a smartphone or other computing device as further described herein.

The enterprise store 210 can include a property list (PLIST) generator 206, a download handler 204, a file handler 220, and a MIME repository 230. The enterprise store can be an Internet marketplace (such as SAP® Enterprise Store) that is a platform for download and upload of software applications. For example, applications, executable files, objects, and the like can be available for upload or download on demand by a customer via a client such as client 202. In some instances, a particular customer can store its developed applications in the enterprise store. The applications can be searchable via a search engine service. The customer can define target audiences for particular applications. For example, users geographically based in Brazil can be granted permission (e.g., authenticated) to download a particular version of an application, while users based elsewhere can be restricted from downloading that version of the application. The target audience can be defined according to any number of criteria including geography, position, user history, and other specifiable privileges associated with a user or a group of users.

The download handler 204 can interface with client 202 to provide requested data. The download handler 204 can perform methods 300 and 400 further described herein. For example, according to an embodiment, the download handler can receive a request for an object. The download handler can parse the request and, if the requested application is available in the enterprise store 210, with the aid of the PLIST generator, the download handler can create a PLIST file and make a downloadable file accessible in temporary memory 232. The download handler can generate a URL (also referred to as a "path") including a unique identifier such as a universally/globally unique identifier (GUID) to direct the requesting client to the application. The download handler can return the URL to the requesting client. The download handler 204 can be communicatively coupled to the PLIST generator 206 and the file handler 220.

The MIME repository 230 can store internet media type (MIME) development objects. The MIME repository 230 can include a temporary memory 232, a temporary memory index 234, and an original file memory 236. Temporary memory 232 can store objects and corresponding PLIST files. A property list can be a structured data representation that stores, organizes, and accesses various types of data. For example, a property list can store file and directory attributes. The object and PLIST file stored in the temporary memory 232 can persist for some time and can be deleted later as further described herein. Temporary memory index 234 can store tables that identify corresponding PLIST files and downloadable objects. The temporary memory 232 can be communicatively coupled to the temporary memory index 234 to perform a lookup of PLIST and downloadable objects. Original file memory 236 can store downloadable objects. When a downloadable object is requested, the downloadable object can be copied from the original file memory 236 to the temporary memory. Each of the memories 232, 234, 236 can be implemented by any software or hardware storage device, e.g., volatile memory such as RAM or non-volatile memory such as ROM. The memories 232, 234, 236 can also be implemented in a single memory module.

The PLIST generator 206 can be communicatively coupled to the download handler 204 to receive requests from the download handler. The PLIST generator can generate and store a PLIST file and a corresponding downloadable object in temporary memory 232. The PLIST generator can receive data parsed from a request for a downloadable object by the download handler and accordingly generate a PLIST file. The PLIST generator 206 can read downloadable objects and place them in temporary memory 232 (e.g., copy the downloadable object to the temporary memory). The PLIST generator 206 can store the respective locations of the generated PLIST file and corresponding downloadable object in a temporary memory index 234. A timestamp can be stored along with the location of the PLIST file and the location of the downloadable object as an entry in a table included in the memory index 234. The timestamp can indicate events related to the PLIST and downloadable object, e.g., a time of creation, and can be used for maintenance of the entries in the memory index 234 as further described herein.

The file handler 220 (also known as a UI Handler) can fetch all requested downloadable objects and return the files to a requestor. The file handler can perform methods 300 and 500 as further described herein. For example, according to an embodiment, the file handler can receive a URL including a GUID. The file handler can parse the URL to extract a PLIST path and retrieve the corresponding downloadable object. The file handler can then return the requested downloadable object to the requestor.

In operation, a client can request an object for download. The download handler can parse the request to extract the parameters of the requested object and requesting client. If the client's parameters indicate that it is part of a target audience for the downloadable object, then, with the aid of the PLIST generator, the download handler can store the downloadable object in a temporary location and create an authenticable URL that points to the temporary location of the downloadable object. The URL can then be returned to the client. Using the URL, the client can request the downloadable object. The file handler can parse the URL to extract the path to the temporary downloadable object. Given that the path is valid, the file handler can retrieve and return the requested object associated with the path. The download handler and the file handler can be Internet Communication Framework (ICF) handlers that facilitate communication with SAP® systems using Internet standard protocols such as HTTP, HTTPS, and SMTP.

In embodiments, the URL permits anonymous access, i.e., anybody with the URL can access the downloadable object stored at the temporary location to which the URL points. For example, the URL may be transferred from one user to another. In embodiments, the security of the download can be adjusted according to a frequency of link maintenance. For example, the URL can be valid for a pre-definable period of time, e.g. five minutes, after which the URL expires and the downloadable object can no longer be accessed with the expired URL. When a URL expires, the corresponding downloadable object can be removed from the temporary location where it is stored.

In embodiments, the security of the download can be adjusted according to the generation of the GUID. A GUID can be dynamically generated each time a user requests a Web page from which an application is downloadable. A GUID is a unique number (i.e., there is a negligible probability of the same number being generated twice) generated according to typical methods such as sequential algorithms or algorithms defined by the Open Software Foundation. The GUID typically has a length of 32 hexadecimal digits, but can also be of other lengths. In an embodiment, the GUID generated by the download handler can be 78 or 79 digits long. For example, the GUID can include 25 digits for a sub-GUID, 10 digits for a platform ID, 32 digits for another sub-GUID, 10 digits for application ID, and 1 or 2 digits for a version ID, totaling 78 or 79 digits depending on whether the version ID uses 1 or 2 digits. The GUID can be integrated with the syntax of a path, e.g., a URL, for example as follows:
http://serverpath/downloadhandler/78_Digit_Guid_Pattern/filename. The GUID can include identifiers such as the requested application, platform of the client, and platform version of the client. The GUID can also identify information regarding creation of the PLIST, as well as fetching from and placement of the downloadable file in a temporary location. The identifiers can be embedded in the GUID, e.g., in a pattern, which can be decoded by the download handler. One advantage of embedding identifiers in the GUID is that it can eliminate additional steps and resources typically used for performing lookup of the identified attributes.

Figure 3:
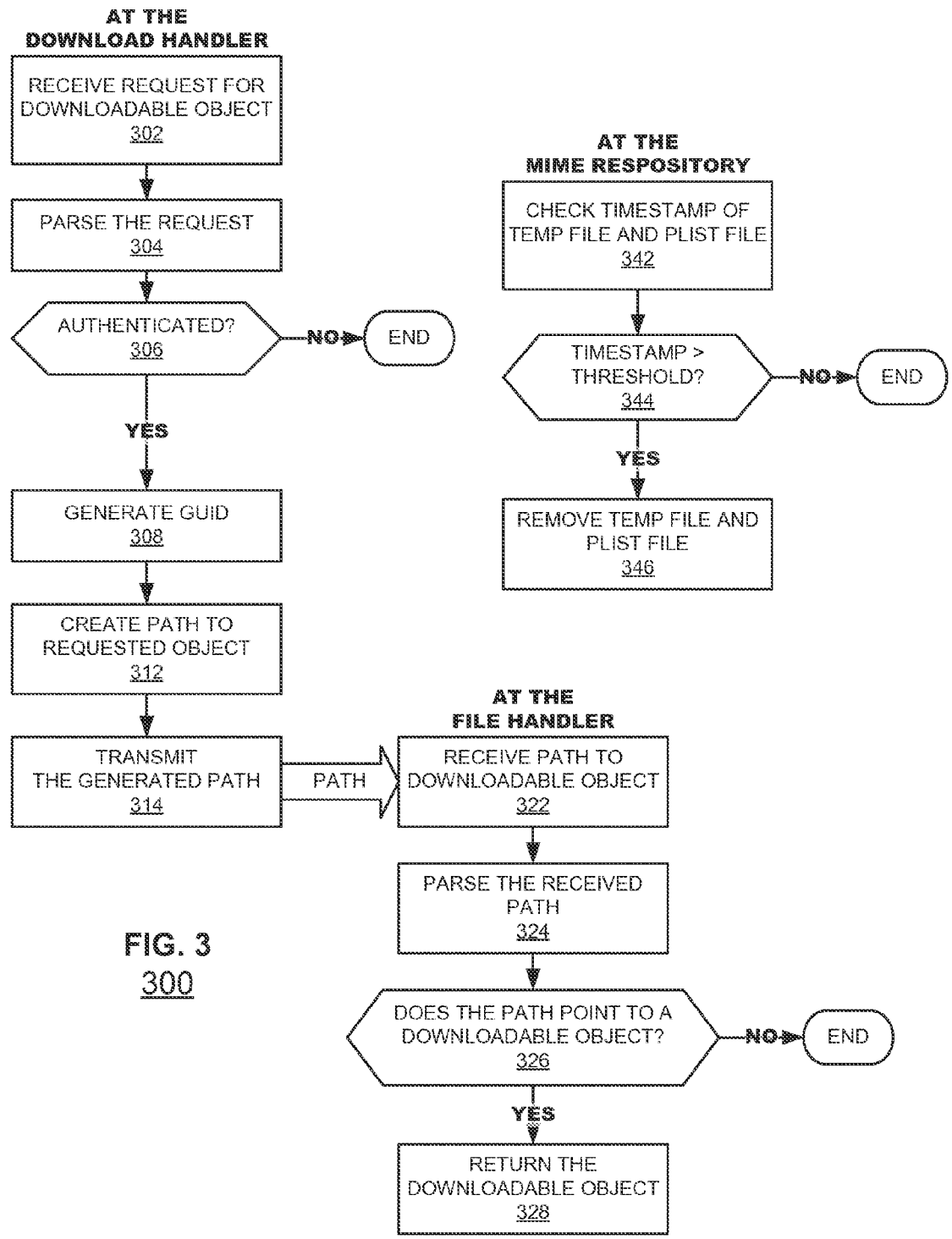
FIG. 3 is a flowchart of an exemplary method for downloading an object according to an example embodiment.

FIG. 3 illustrates a method 300 for downloading an object. Boxes 302-314 can be performed by a processor such as download handler 204. In box 302, the method 300 can receive a request for a downloadable object. The method 300 can then decode the request to extract parameters regarding the request and the requestor in box 304. The method 300 can authenticate the requestor (box 306). If the requestor is not authenticated in box 306, the method 300 can terminate. Otherwise, if the requestor is authenticated, the method 300 can proceed to box 308 to generate one or more GUIDs. In box 312, the generated GUIDs can be used to create a path to the requested download, e.g., a URL, and a PLIST path. The method 300 can then return the generated path (box 314). In an embodiment the path can be transmitted as represented by the arrow, and ultimately received by a file handler to retrieve the requested object (box 322). The process of generating a PLIST and URL from a request is further described herein with respect to method 400.

In box 304, the extracted parameters can include an application ID identifying the requested downloadable object, a platform ID indicating the type of platform the requestor client device is using such as the operating system, and a platform version indicating further information of the operation system such as its version number. In box 306, GUIDs (e.g., two 32-digit GUIDs) can be generated. The PLIST generated based on the GUIDs can be of the format: /GUID1/GUID2/OTA.PLIST, where GUID1 can be one of the two 32-digit GUIDs and GUID2 can be another one of the two 32-digit GUIDs.

In box 306, the authentication can identify whether the requestor has access to the requested object. For example, the method 300 can determine whether the request is coming from a user that has been granted permission to download the requested object. Permissions and privileges can be pre-defined. For example, a downloadable object can be associated with a list of users, and those requestors who are on the list can be authenticated to download the object. As another example, a downloadable object can have an associated number of downloads, which can be tracked, and those requests after a predefined number are not authenticated. For instance, the first 1000 requests and/or users to request a downloadable object can be permitted to download the object and those who request the object after the first 1000 requests and/or users can be denied access or be asked to pay a fee before authentication. As yet another example, a user's attributes (e.g., sales position, geographic location, etc.) can be considered, and if the user belongs to a category of users permitted to download the object, the user can be authenticated in box 306. For instance, users geographically based in Brazil can be allowed to download a particular version of an object, i.e., authenticated, while users based elsewhere can be restricted from downloading that version of the object, i.e. not authenticated.

In box 308, a temporary file and PLIST file can be generated in conjunction with the GUID as further described herein. The temporary file can be a copy of the requested object. For example, as further described herein, a download handler can store the requested object in a temporary location and create an authenticable URL that points to the temporary location where the requested object is stored.

In box 312, the generated path can be returned to the requestor, for example by displaying a URL on a user interface of the client device sending the request. In an alternative embodiment, the URL can be automatically loaded or the user can be automatically redirected to a destination indicated by the URL, so that the requestor need not perform an extra step of activating the URL, e.g., clicking on or tapping the URL.

Boxes 322-328 can be performed by a processor such as file handler 220. In box 322, the method 300 can receive a URL to a downloadable object. The method 300 can decode the received URL in box 324. In box 326, the method 300 can determine whether the path points to a downloadable object. If it does, the method 300 can return the object for downloading in box 328. Otherwise, if the path does not point to an object, then the method can terminate. The process of looking up and returning a requested object for download is further described herein with respect to method 500.

Boxes 342-346 can be performed by a processor such as a processor controlling the MIME repository 230. In box 342, the method 300 can check a timestamp of a temporary file and PLIST file. The method 300 can then determine in box 344 whether a timestamp exceeds a pre-definable threshold. A timestamp that exceeds a threshold can indicate that the temporary and PLIST files are stale. If it is determined that the timestamp exceeds the threshold in box 344, the method 300 can proceed to box 346 and remove the temporary file and the PLIST file from memory, for example from temporary memory 232. In box 346, the method 300 can set a timestamp indicating the time of deletion and set a flag indicating that a temporary file and PLIST file were deleted. For example, this information can be saved as a deletion time stamp and a flag in temporary memory index 234. The temporary file and PLIST file can be generated in box 308 in conjunction with the generation of the GUID. As further described herein, the timestamp of the generated PLIST and temporary file can be stored in temporary memory index 234. Boxes 342-346 can be performed at any time after a PLIST file has been generated, for example in association with generation of the GUID in box 308. Boxes 342-346 can be scheduled and/or periodically performed. For example, boxes 342-346 can be performed periodically on temporary memory index 234 to check a creation timestamp or the like indicating how long each entry of MIME path URLs and downloadable object has been in temporary memory index 234. All entries with a timestamp greater than a specifiable time limit can be removed according to box 346.

When method 300 ends due to a requestor not being authenticated in box 306 or a requested downloadable object not existing in box 326, the method can return an error message to the requestor, for example via a user interface (UI). The method 300 can also provide trouble-shooting messages to the requestor, for example indicating the reason for the method ending and provide prompts to attempt other requests, e.g., another request or another URL. As described above, the download handler, file hander, and MIME repository can be implemented in a single system, and the method can also be performed by a single processor.

Figure 4:
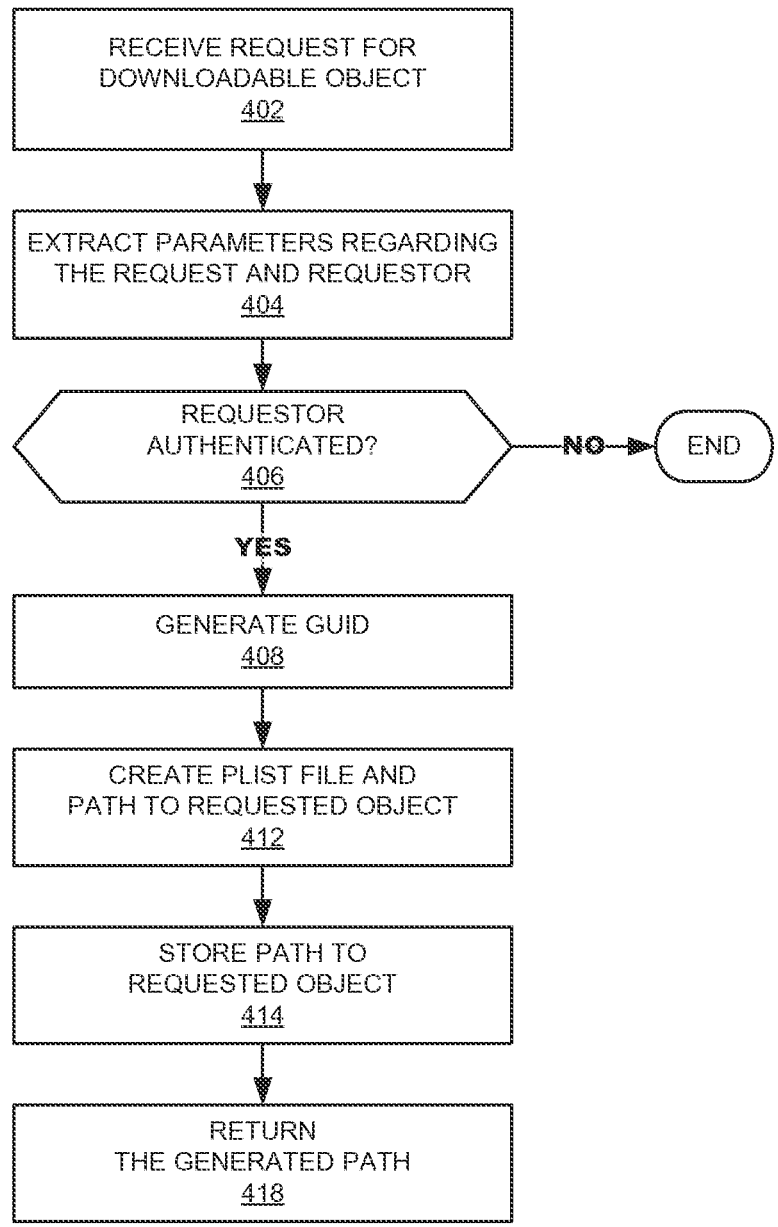
FIG. 4 is a flowchart of an exemplary method for receiving a download request and generating a path to a downloadable object according to an example embodiment.

FIG. 4 illustrates a method 400 of receiving a download request and generating an authenticable path to a downloadable object. The method 400 can be performed by a processor such as download handler 204. In box 402, the method 400 can receive a request for a downloadable object. The method 400 can decode the downloadable object to extract parameters regarding the request and the requestor in box 404. The method 400 can authenticate the requestor (box 406). If the requestor is authenticated, the method 400 can proceed to box 408 to generate one or more GUIDs. Otherwise, if the requestor is not authenticated, the method 400 can terminate. In box 412, the GUIDs generated in box 408 can be used to create a path of a PLIST and a URL to the requested download. In box 414, the method 400 can store the PLIST path, for example in a memory table. The method 400 can then return the generated path (box 418). Boxes 402-418 can be performed as part of method 300, for example by replacing boxes 302-314.

As further discussed herein, in box 404, the extracted parameters can include an application ID identifying the requested downloadable object, a platform ID indicating the type of platform the requestor client device is using such as the operating system, and a platform version indicating further information of the operation system such as its version number. In box 306, GUIDs (e.g., two 32-digit GUIDs) can be generated. The PLIST generated based on the GUIDs can be of the format:/GUID1/GUID2/OTA.PLIST, where GUID1 can be one of the two 32-digit GUIDs and GUID2 can be another one of the two 32-digit GUIDs.

In box 406, the authentication can identify whether the requestor has access to the requested object. For example, the method 400 can determine whether the request is coming from a user that has been granted permission to download the requested object. Permissions and privileges can be pre-defined. For example, a downloadable object can be associated with a list of users, and those requestors who are on the list can be authenticated to download the object. As another example, a downloadable object can have an associated number of downloads, which can be tracked, and those requests after a predefined number are not authenticated. For instance, the first 1000 requests and/or users to request a downloadable object can be permitted to download the object and those who request the object after the first 1000 requests and/or users can be denied access or be asked to pay a fee before authentication. As yet another example, a user's attributes (e.g., sales position, geographic location, etc.) can be considered, and if the user belongs to a category of users permitted to download the object, the user can be authenticated in box 306. For instance, users geographically based in Brazil can be allowed to download a particular version of an object, i.e., authenticated, while users based elsewhere can be restricted from downloading that version of the object, i.e. not authenticated.

In box 408, a temporary file and PLIST file can be generated in conjunction with the GUID as further described herein. The temporary file can be a copy of the requested object. For example, as further described herein, a download handler can store the requested object in a temporary location and create an authenticable URL that points to the temporary location where the requested object is stored.

In box 412, the generated path can be returned to the requestor, for example by displaying a URL on a user interface of the client device sending the request. In an alternative embodiment, the URL can be automatically loaded or the user can be automatically redirected to the destination indicated by the URL, so that the requestor need not perform an extra step of activating the URL, e.g., clicking on or tapping the URL. Boxes 402-422 can be performed as part of method 300, for example replacing boxes 302-314.

In box 414, the method 400 can store the PLIST path in a memory table such as in temporary memory index 234. Alternatively, the method can store part of the PLIST path. For example, if the generated PLIST path is . . . /GUID1/GUID2/OTA.PLIST, the method 400 can store a path until a pre-definable folder level in the memory table. In the example provided, . . . /GUID1/GUID2/OTA.PLIST, the PLIST path up to a top folder level can be stored in the memory table. The PLIST file can also be placed in the same entry in the memory table as the PLIST path.

Figure 5:
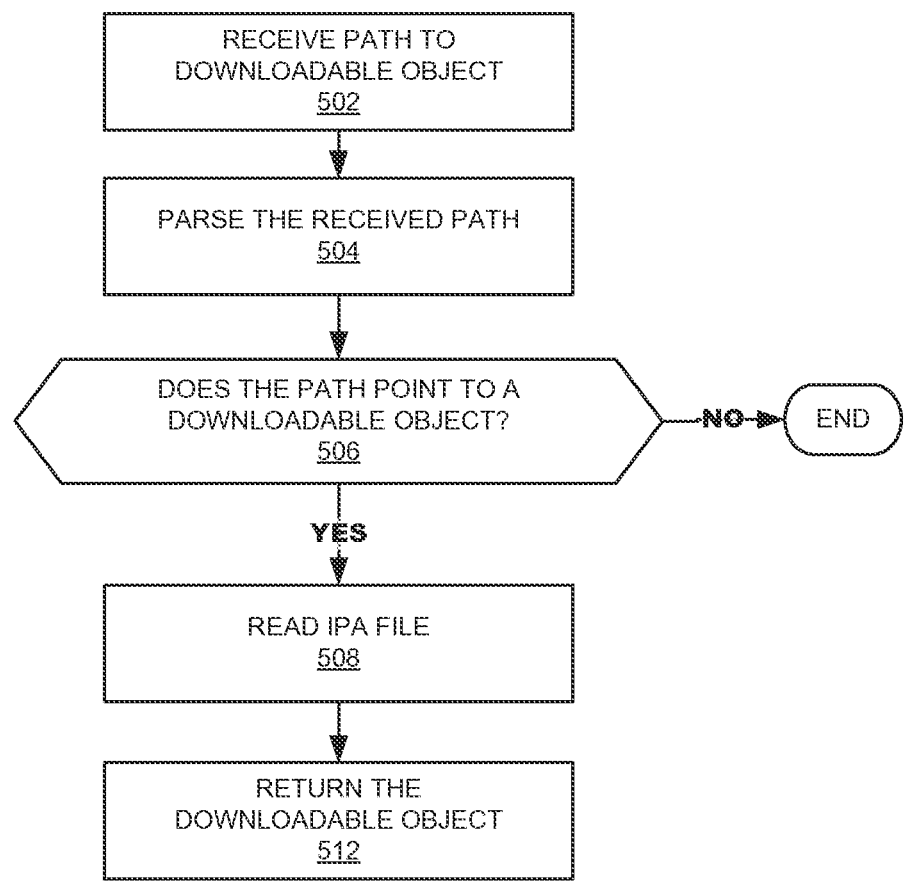
FIG. 5 is a flowchart of an exemplary method for receiving a path to a downloadable object and retrieving the object according to an example embodiment.

FIG. 5 illustrates a method 500 for receiving a path to a downloadable object and retrieving the object. Method 500 can be performed by a processor such as file handler 220. In box 502, the method 500 can receive a URL to a downloadable object. The method 500 can decode the received URL in box 504. In box 506, the method 500 can determine whether the path points to a downloadable object. If the path points to a downloadable object, the method 500 can read an application file, for example an IPA file, in box 508, and proceed to box 512 in which the method 500 can uncompress the IPA file as necessary, and return the object for downloading. Otherwise, if the path does not point to an object, the method 500 can terminate. Boxes 502-512 can be performed as part of method 300, for example replacing boxes 322-332.

It should be appreciated that the present invention can be implemented in numerous ways, including as a process, an apparatus, a system, a computer processor executing software instructions, a mobile device, a smart device, a mobile application, or a computer readable medium such as a computer readable storage medium, or a computer network wherein program instructions are sent over optical or electronic communication or non-transitory links. It should be noted that the order of the steps of disclosed processes can be altered within the scope of the invention, as noted in the appended Claims and in the description herein.

The foregoing discussion has described operation of the embodiments of the present invention in the context of terminals that embody downloading systems. Commonly, these components are provided as electronic devices. They can be embodied in integrated circuits, such as application specific integrated circuits, field programmable gate arrays and/or digital signal processors. Alternatively, they can be embodied in computer programs that execute on personal computers, notebook computers, tablet computers, smartphones or computer servers. Such computer programs typically are stored in physical storage media such as electronic-, magnetic- and/or optically-based storage devices, where they are read to a processor under control of an operating system and executed. And, of course, these components may be provided as hybrid systems that distribute functionality across dedicated hardware components and programmed general-purpose processors, as desired.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A computer-implemented method of providing an object to a specifiable requestor, the method comprising:
  receiving, by a processor, a request for the object;
  extracting, by the processor, parameters regarding the object and the requestor from the request;
  authenticating, by the processor, the requestor;
  responsive to the authentication of the requestor, generating, by the processor, at least one unique identifier based on the extracted parameters, wherein the unique identifier encodes at least one of: an identification of the requested object, an identification of the requestor's platform, and a version of the platform;

storing, by the processor, a copy of the requested object in a temporary location;

generating, by the processor, a PLIST file indicating the temporary location of the copy of the requested downloadable object;

generating, by the processor, a path to the copy of the requested object, wherein the path includes the at least one unique identifier, and the path is generated based on the PLIST file; and returning, by the processor, the path.

2. The method of claim 1, wherein when a predefined time elapses since the generation of the path, the path expires and the PLIST file and the copy of the object are removed from the temporary location.

3. The method of claim 2, wherein the paths and corresponding copy of the object are periodically checked to determine whether to remove them.

4. The method of claim 1, wherein the parameters extracted from the request include at least one of: an identification of the requested object, an identification of the requestor's platform, and a version of the platform.

5. The method of claim 1, wherein the authentication includes determining whether the requestor belongs to a predefined group of users allowed to access the downloadable object.

6. The method of claim 5, wherein the authentication includes determining whether the requestor requests the object after a threshold number of requests.

7. The method of claim 1, wherein the path to the requested object includes syntax of the format: /the unique identifier/filename.

8. The method of claim 1, further comprising generating a PLIST path to internally locate the copy of the file; and
wherein two unique identifiers are generated responsive to the authentication of the requestor; and
the path to the requested object includes syntax of the format/a first unique identifier/a second unique identifier/OTA.PLIST.

9. The method of claim 1, wherein returning of the path includes automatically redirecting the requestor based on the path.

10. The method of claim 1, wherein the storing of the copy of the object includes storing an entry including the path to the requested object and a PLIST path with a timestamp of a creation of the entry in a temporary memory index.

11. The method of claim 2, wherein the removal of the copy of the object includes storing a timestamp of a deletion time and a flag signaling the deletion.

12. The method of claim 1, wherein a requestor with a non-expired path to the requested object is authenticated and receives access to the requested object.

13. A non-transitory computer-readable storage device storing program instructions that, when executed, cause an executing device to perform a method for retrieving data from a legacy system, the method comprising:

receiving, by a processor, a request for the object;
extracting, by the processor, parameters regarding the object and the requestor from the request;
authenticating, by the processor, the requestor;
responsive to the authentication of the requestor, generating, by the processor, at least one unique identifier based on the extracted parameters, wherein the unique identifier encodes at least one of: an identification of the requested object, an identification of the requestor's platform, and a version of the platform;

storing, by the processor, a copy of the requested object in a temporary location;

generating, by the processor, a PLIST file indicating the temporary location of the copy of the requested downloadable object;

generating, by the processor, a path to the copy of the requested object, wherein the path includes the at least one unique identifier, and the path is generated based on the PLIST file; and returning, by the processor, the path.

14. A system comprising:
at least one processor; and
memory storing instructions which, when executed by the at least one processor, result in operations comprising:
receiving a request for the object;
extracting parameters regarding the object and the requestor from the request;
authenticating the requestor;
responsive to the authentication of the requestor, generating at least one unique identifier based on the extracted parameters, wherein the unique identifier encodes at least one of: an identification of the requested object, an identification of the requestor's platform, and a version of the platform;
storing a copy of the requested object in a temporary location;
generating a PLIST file indicating the temporary location of the copy of the requested downloadable object;
generating a path to the copy of the requested object, wherein the path includes the at least one unique identifier, and the path is generated based on the PLIST file; and
returning the path.

15. The system of claim 14, wherein when a predefined time elapses since the generation of the path, the path expires and the PLIST file and the copy of the object are removed from the temporary location.

16. The system of claim 15, wherein the paths and corresponding copy of the object are periodically checked to determine whether to remove them.

17. The system of claim 14, wherein the parameters extracted from the request include at least one of: an identification of the requested object, an identification of the requestor's platform, and a version of the platform.

18. The system of claim 14, wherein the authentication includes determining whether the requestor belongs to a predefined group of users allowed to access the downloadable object.

19. The system of claim 18, wherein the authentication includes determining whether the requestor requests the object after a threshold number of requests.

20. The system of claim 7, wherein the path to the requested object includes syntax of the format: /the unique identifier/filename.

21. The system of claim 14, wherein the operations further comprise:
generating a PLIST path to internally locate the copy of the file; and
wherein two unique identifiers are generated responsive to the authentication of the requestor; and
the path to the requested object includes syntax of the format/a first unique identifier/a second unique identifier/OTA.PLIST.

22. The system of claim 14, wherein returning of the path includes automatically redirecting the requestor based on the path.

23. The system of claim 14, wherein the storing of the copy of the object includes storing an entry including the path to the requested object and a PLIST path with a timestamp of a creation of the entry in a temporary memory index.

24. The method of claim 16, wherein the removal of the copy of the object includes storing a timestamp of a deletion time and a flag signaling the deletion.

* * * * *